United States Patent [19]
Fairchild

[11] Patent Number: 6,114,656
[45] Date of Patent: Sep. 5, 2000

[54] WELDING METHODS FOR PRODUCING ULTRA-HIGH STRENGTH WELDMENTS WITH WELD METALS HAVING EXCELLENT CRYOGENIC TEMPERATURE FRACTURE TOUGHNESS

[75] Inventor: Douglas P. Fairchild, Sugar Land, Tex.

[73] Assignee: ExxonMobil Upstream Research Company, Houston, Tex.

[21] Appl. No.: 09/099,266

[22] Filed: Jun. 18, 1998

Related U.S. Application Data

[60] Provisional application No. 60/050,280, Jun. 20, 1997, provisional application No. 60/053,966, Jul. 28, 1997, and provisional application No. 60/085,462, May 14, 1998.

[51] Int. Cl.$^7$ .................................................. B23K 35/22
[52] U.S. Cl. .............................. 219/137 WM; 219/137; 219/146.23
[58] Field of Search .................................. 219/137 WM, 219/146.23, 137, 145; 428/638

[56] References Cited

U.S. PATENT DOCUMENTS

| | | | |
|---|---|---|---|
| 3,097,294 | 7/1963 | Kubli et al. | 219/145 |
| 3,716,691 | 2/1973 | Baybrook et al. | 219/137 |
| 3,745,322 | 7/1973 | Ito et al. | 219/137 |
| 3,769,491 | 10/1973 | De Long et al. | 219/137 |
| 3,853,611 | 12/1974 | Godai et al. | 117/205 |
| 3,919,519 | 11/1975 | Peterson | 219/137 |
| 5,523,540 | 6/1996 | Coldren et al. | 219/137 WM |

OTHER PUBLICATIONS

K. E. Dorschu et al., "Development of a Filler Metal for a High–Toughness Alloy Plate Steel with a Mininum Yield Strength of 140 ksi", The Welding Journal, Dec. 1964, pp. 564s–575s.

G. G. Saunders, "Effect of Major Alloying Elements on the Toughness of High Strength Weld Metal", Welding Research International, vol. 7, No. 2, 1977, pp. 91–118.

Reference cited by the Taiwan Patent Office in counterpart application, reference title— "Electronic Welding Operation Handbook Part 1", 1994, pp. 33–41; English language translations of relevant portions as provided by Applicant's agent in Taiwan.

Reference cited by the Taiwan Patent Office in counterpart application, reference title— "Welding Handbook vol. 2", 1993, pp. 190–195; English language translations of relevant portions as provided by Applicants's agent in Taiwan.

*Primary Examiner*—Patrick Ryan
*Assistant Examiner*—Anjan Dey
*Attorney, Agent, or Firm*—Marcy Lyles

[57] ABSTRACT

Welding methods are provided for use in joining ultra-high strength, low alloy steels to produce weldments having tensile strengths greater than about 900 MPa (130 ksi) with weld metals having fracture toughness suitable for cryogenic applications according to known principles of fracture mechanics.

17 Claims, 1 Drawing Sheet

WELDING METHODS FOR PRODUCING ULTRA-HIGH STRENGTH WELDMENTS WITH WELD METALS HAVING EXCELLENT CRYOGENIC TEMPERATURE FRACTURE TOUGHNESS

This application claims the benefit of (i) U.S. Provisional Application No. 60/050,280, filed Jun. 20, 1997; (ii) U.S. Provisional Application No. 60/053,966, filed Jul. 28, 1997; and (iii) U.S. Provisional Application No. 60/085,462, filed May 14, 1998.

FIELD OF THE INVENTION

This invention relates to methods for producing ultra-high strength weldments with weld metals having excellent cryogenic temperature fracture toughness. More particularly, this invention relates to methods for producing ultra-high strength weldments with weld metals having excellent cryogenic temperature fracture toughness on ultra-high strength, low alloy steels.

BACKGROUND OF THE INVENTION

Various terms are defined in the following specification. For convenience, a Glossary of terms is provided herein, immediately preceding the claims.

Frequently, there is a need to store and transport pressurized, volatile fluids at cryogenic temperatures, i.e., at temperatures lower than about −40° C. (−40° F.). For example, there is a need for containers for storing and transporting pressurized liquefied natural gas (PLNG) at pressures in the broad range of about 1035 kPa (150 psia) to about 7590 kPa (1100 psia) and at temperatures higher than about −123° C. (−190° F.). There is also a need for containers for safely and economically storing and transporting other pressurized fluids, such as methane, ethane, and propane, at cryogenic temperatures. For such containers to be constructed of a welded steel, the steel and its weldments (see Glossary) must have adequate strength to withstand the fluid pressure and adequate toughness to prevent initiation of a fracture, i.e., a failure event, at the operating conditions.

As will be familiar to those skilled in the art, the Charpy V-notch (CVN) test can be used for the purpose of fracture toughness assessment and fracture control in the design of storage containers for transporting pressurized, cryogenic temperature fluids, such as PLNG, particularly through use of the ductile-to-brittle transition temperature (DBTT). The DBTT delineates two fracture regimes in structural steels. At temperatures below the DBTT, failure in the Charpy V-notch test tends to occur by low energy cleavage (brittle) fracture, while at temperatures above the DBTT, failure tends to occur by high energy ductile fracture. Storage and transportation containers that are constructed from welded steels for the aforementioned cryogenic temperature applications and for other load-bearing, cryogenic temperature service must have DBTTs, as determined by the Charpy V-notch test, well below the service temperature of the structure in order to avoid brittle failure. Depending on the design, the service conditions, and/or the requirements of the applicable classification society, the required DBTT temperature shift (i.e., how far the DBTT must be below the intended service temperature) may be from 5° C. to 30° C. (9° F. to 54° F.) below the service temperature.

Nickel-containing steels conventionally used for cryogenic temperature structural applications, e.g., steels with nickel contents of greater than about 3 wt %, have low DBTTs, but also have relatively low tensile strengths. Typically, commercially available 3.5 wt % Ni, 5.5 wt % Ni, and 9 wt % Ni steels have DBTTs of about −100° C. (−150° F.), −155° C. (−250° F.), and −175° C. (−280° F.), respectively, and tensile strengths of up to about 485 MPa (70 ksi), 620 MPa (90 ksi), and 830 MPa (120 ksi), respectively. In order to achieve these combinations of strength and toughness, these steels generally undergo costly processing, e.g., double annealing treatment. In the case of cryogenic temperature applications, industry currently uses these commercial nickel-containing steels because of their good toughness at low temperatures, but must design around their relatively low tensile strengths. The designs generally require excessive steel thicknesses for load-bearing, cryogenic temperature applications. Thus, use of these nickel-containing steels in load-bearing, cryogenic temperature applications tends to be expensive due to the high cost of the steel combined with the steel thicknesses required.

Current commercial storage containers for transportation of liquefied natural gas at −162° C. (−260° F.) and atmospheric pressure (LNG) are typically constructed of the above-mentioned commercial nickel-containing steels, austenitic stainless steels, or aluminum. In LNG applications, the strength and toughness requirements for such materials, and for weldments joining such materials, are distinctly different from those for the PLNG case. For example, in discussing the welding of 2¼ wt % to 9 wt % Ni steels for cryogenic purposes, G. E. Linnert, in "Welding Metallurgy", American Welding Society, 3rd Ed., Vol. 2, 1967, pp. 550–570, lists the Charpy V-notch toughness (see Glossary) requirements for such weldments as ranging from about 20 J to 61 J as measured at the service temperature. Also, the 1995 publication, Det Norske Veritas (DNV) Rules For Classification of Ships, specifies that materials used in new-built, liquefied gas carrying ships must meet certain minimum Charpy V-notch toughness requirements. Specifically, the DNV Rules state that plates and weldments used for pressure vessels with design temperatures ranging from −60° C. to −165° C. must meet a minimum Charpy toughness of 27 J at test temperatures ranging from 5° C. to 30° C. (9° F. to 54° F.) below the design temperature. The requirements listed by Linnert and the DNV Rules cannot be directly applied to the construction of containers for transportation of PLNG (or other pressurized, cryogenic fluids) since the PLNG containment pressure, typically about 2760 kPa (400 psia), is significantly higher than for conventional methods of transporting LNG, which is generally at or near atmospheric pressure. For PLNG storage and transportation containers, there is a need for more stringent toughness requirements, and therefore, a need for weldments with better toughness properties than those now used for constructing LNG storage containers.

Base Plate Material

Storage containers for pressurized, cryogenic temperature fluids, such as PLNG, are preferably constructed from discrete plates of an ultra-high strength, low alloy steel. Three co-pending U.S. patent applications identify various weldable, ultra-high strength, low alloy steels with excellent cryogenic temperature toughness for use in constructing storage containers for transporting PLNG and other pressurized, cryogenic temperature fluids. The steels are described in a co-pending U.S. patent application entitled "ULTRA-HIGH STRENGTH STEELS WITH EXCELLENT CRYOGENIC TEMPERATURE TOUGHNESS", which has a priority date of Dec. 19, 1997 and is identified by the United States Patent and Trademark Office ("USPTO") as application Ser. No. 09/099,649 and has been published in WO 99/32672 in a co-pending U.S. patent application entitled "ULTRA-HIGH STRENGTH AUSAGED STEELS WITH EXCELLENT CRYOGENIC TEMPERATURE TOUGHNESS", which has a priority date of Dec. 19, 1997 and is identified by the USPTO as application Ser. No. 09/099,153 and has been published in WO 99/32670 and in a co-pending U.S. provisional patent application entitled "ULTRA-HIGH STRENGTH DUAL PHASE STEELS WITH EXCELLENT CRYOGENIC TEMPERATURE TOUGHNESS", which has a priority date of Dec. 19, 1997 and is identified by the USPTO as application Ser. No. 09/099,152 and has been published in WO 99/32671. These steels are especially suitable for many cryogenic temperature applications, including transportation of PLNG, in that the steels have the following characteristics for steel plate thicknesses of preferably about 2.5 cm (1 inch) and greater: (i) DBTT lower than about −73° C. (−100° F.), preferably lower than about −107° C. (−160° F.), in the base steel and in the weld HAZ, (ii) tensile strength greater than 830 MPa (120 ksi), preferably greater than about 860 MPa (125 ksi), and more preferably greater than about 900 MPa (130 ksi), (iii) superior weldability, (iv) substantially uniform through-thickness microstructure and properties, and (v) improved toughness over standard, commercially available, ultra-high strength, low alloy steels. The steels described in the above-mentioned co-pending U.S. provisional patent applications may have a tensile strength of greater than about 930 MPa (135 ksi), or greater than about 965 MPa (140 ksi), or greater than about 1000 MPa (145 ksi). Other suitable steels are described in a European Patent Application published Feb. 5, 1997, and having International application number: PCT/JP96/00157, and International publication number WO 96/23909 (08.08.1996 Gazette 1996/36) (such steels preferably having a copper content of 0.1 wt % to 1.2 wt %), and in a co-pending U.S. patent application entitled "ULTRA-HIGH STRENGTH, WELDABLE STEELS WITH EXCELLENT ULTRA-LOW TEMPERATURE TOUGHNESS", which has a priority date of Jul. 28, 1997 and is identified by the USPTO as Application Ser. No. 09/123,625 and has been published in WO 99/05335.

Welding

Such steels may be joined together to form storage containers for pressurized, cryogenic temperature fluids, such as PLNG, by a welding method suitable for producing a weldment that provides adequate strength and fracture toughness for the intended application. Such a welding method preferably includes a suitable welding process, for example without limitation, gas metal arc welding ("GMAW"), tungsten inert gas ("TIG") welding, or submerged arc welding ("SAW"); a suitable welding consumable wire; a suitable welding consumable gas (if required); a suitable welding flux (if required); and suitable welding procedures, for example without limitation, preheat temperatures, and welding heat inputs. A weldment is a welded joint, including: (i) the weld metal, (ii) the heat-affected zone ("HAZ"), and (iii) the base metal in the "near vicinity" of the HAZ. The weld metal is the welding consumable wire (and flux, if used) as deposited and diluted by the portion of the base metal plate that melts during performance of the welding process. The HAZ is the portion of the base metal that does not melt during welding, but whose microstructure and mechanical properties are altered by the heat of the welding process. The portion of the base metal that is considered within the "near vicinity" of the HAZ, and therefore, a part of the weldment, varies depending on factors known to those skilled in the art, for example without limitation, the width of the weldment, the dimensions of the base metal plate that is welded, and the distances between weldments.

Properties of Weldments Desired for PLNG Applications

For the purpose of constructing storage containers for PLNG and other pressurized, cryogenic temperature fluids, it is desirable to have a welding method, including a welding consumable wire, a welding consumable gas, a welding process, and welding procedures that will provide weldments with tensile strengths and fracture toughnesses suitable for the intended cryogenic application, according to known principles of fracture mechanics, as described herein. More particularly, for constructing storage containers for PLNG, it is desirable to have a welding method that will provide weldments with tensile strengths greater than about 900 MPa (130 ksi) and fracture toughnesses suitable for the PLNG application according to known principles of fracture mechanics, as described herein. The tensile strength of such weldments is preferably greater than about 930 MPa (135 ksi), more preferably greater than about 965 MPa (140 ksi), and even more preferably at least about 1000 MPa (145 ksi). Current commercially available welding methods using commercially available welding consumable wires are not suitable for welding the aforementioned high strength, low alloy steels and providing weldments with the desired properties for commercial cryogenic, pressurized applications.

Consequently, the primary objects of the present invention are to improve the state-of-the-art welding technology for applicability to ultra-high strength, low alloy steels so as to provide a welding method that will produce weldments that have tensile strengths greater than about 900 MPa (130 ksi) and fracture toughnesses suitable for the intended cryogenic application according to known principles of fracture mechanics, as described herein.

SUMMARY OF THE INVENTION

A welding method (including a welding consumable wire, a welding process type, and the selection of certain welding parameters and practices) is provided that can be used to join ultra-high strength, low alloy steels with excellent cryogenic temperature fracture toughness for cryogenic applications. The welding method of this invention is formulated to produce a microstructure yielding a set of mechanical properties suitable for the stringent demands of pressurized, cryogenic temperature fluid applications, such as the PLNG application. The welding method produces a weld metal that is dominated by a very fine-grained body centered cubic (BCC) crystal structure. The welding method also provides a weld metal having a low impurity content, and thus, a low non-metallic inclusion content and, additionally, creates individual inclusions that are small in size. The fundamental effects of fine grain size on strength and toughness of structural steels, as well as the fundamental effects of low inclusion content on toughness, are well known to those skilled in the art. However, techniques for achieving such characteristics in weld metals suitable for the PLNG application are not widely known. The weldment resulting from use of the welding method of this invention has a tensile strength greater than about 900 MPa (130 ksi) and a toughness adequate for the PLNG application, in accordance with known principles of fracture mechanics.

DESCRIPTION OF THE DRAWINGS

The advantages of the present invention will be better understood by referring to the following detailed description and the attached drawings in which.

Figure 1A:
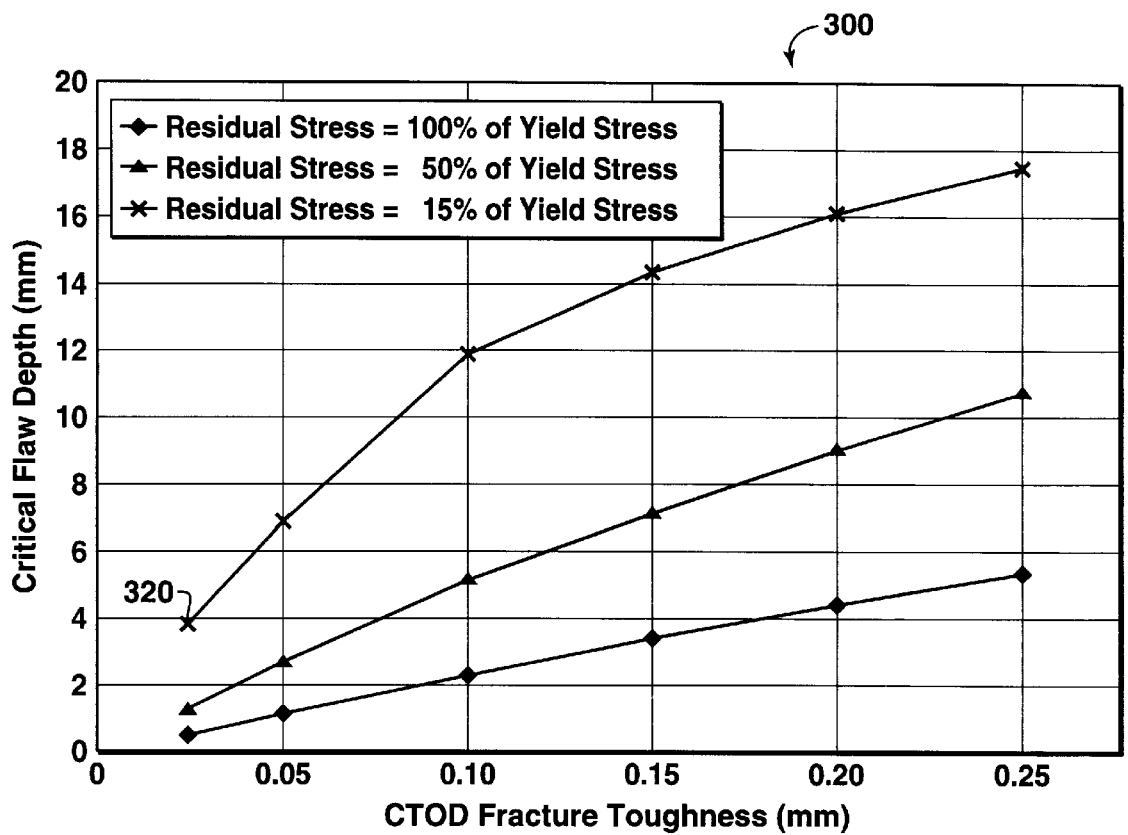
FIG. 1A illustrates a plot of critical flaw depth, for a given flaw length, as a function of CTOD fracture toughness and of residual stress.

While the invention will be described in connection with its preferred embodiments, it will be understood that the invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

The present invention relates to a welding method for use in joining ultra-high strength, low alloy steels, whereby the resulting weldments have ultra-high strengths and excellent cryogenic temperature toughnesses. These desirable properties are afforded, primarily, by two micro-engineered aspects of the weld metal. The first feature is a very fine-grained body centered cubic (BCC) crystal structure and the second feature is a low non-metallic inclusion content wherein the individual inclusions are small in size. The welding method includes a welding consumable wire, a welding process type, and the selection of certain welding parameters and practices. The preferred welding processes for the welding method of this invention are any of the gas shielded processes such as gas metal arc welding (GMAW), tungsten inert gas welding (TIG), plasma arc welding (PAW), or their derivatives. Preferred welding parameters and practices, such as heat input and composition of shielding gas, are further described herein.

Chemical Composition of Weld Metals

In one embodiment, a weld metal chemistry according to the present invention comprises iron and alloying elements in about the amounts indicated in Table I and below.

TABLE 1

| Alloying Element | Preferred Lower Limit (wt %) | Preferred Upper Limit (wt %) |
| --- | --- | --- |
| carbon (C) | 0.06 | 0.10 |
| manganese (Mn) | 1.60 | 2.05 |
| silicon (Si) | 0.20 | 0.32 |
| nickel (Ni) | 1.87 | 6.00 |
| chromium (Cr) | 0.30 | 0.87 |
| molybdenum (Mo) | 0.40 | 0.56 |
| copper (Cu) | 0 | 0.30 |
| aluminum (Al) | 0 | 0.020 |
| zirconium (Zr) | 0 | 0.015 |
| titanium (Ti) | 0 | 0.010 |

More preferably, the upper limit for nickel content is about 4.00 wt %.

The Effect of Fine Grain Size

The fine grain size in the microstructure of a weld metal made according to this invention increases strength of the weldment through dislocation blockage. The fine grain size increases cleavage toughness by shortening the length of dislocation pileups which decreases the maximum possible stress intensity at the head of any single pileup. This makes microcrack initiation less probable. The lower pileup intensity also improves ductile fracture toughness by reducing local microstrains, thus making microvoid initiation less probable. Additionally, the fine grain size increases global toughness by providing many "roadblocks" to crack advance. (See Glossary for definitions of dislocation blockage, cleavage toughness, dislocation pileup, microcrack, microstrains, and microvoid.)

Achieving the Microstructure and Grain Size

The fine-grained BCC structure is preferably dominated by auto-tempered lath martensite, i.e., contains at least about 50 volume percent, more preferably at least about 70 volume percent, and even more preferably at least about 90 volume percent, auto-tempered lath martensite. However, significant amounts of lower bainite can also be present, e.g., up to about 49 volume percent. Minor constituents such as acicular ferrite, polygonal ferrite, and upper bainite (or other degenerate forms of bainite) can also be present in small amounts, but preferably do not constitute the dominant morphology. The desired martensitic/bainitic microstructure is achieved by use of appropriate weld metal chemistry and proper control of the weld metal cooling rate. Several examples which discuss chemistries are provided below. Low heat input welding is used so that the weld metal cools more quickly than it would with typically used higher heat inputs. Heat input is defined as the welding voltage multiplied by the welding current and divided by the welding travel speed, i.e., arc energy. The low heat input welding used in the welding method of this invention has arc energies preferably within the range of about 0.3 kJ/mm to about 2.5 kJ/mm (7.6 kJ/inch to 63.5 kJ/inch), but more preferably within the range of about 0.5 kJ/mm to about 1.5 kJ/mm (12.7 kJ/inch to 38 kJ/inch). Several different levels of "grain size" can be described within the desired microstructure and the low heat input welding technique is intended to reduce the size of each unit. A low welding heat input helps in the formation of a small columnar grain size, a small prior austenite grain size, a small martensite/bainite packet size, and a narrow martensite and/or bainite lath width. As used herein in reference to structure, "fine-grained" means that the columnar grain size (width) is preferably less than about 150 microns, and more preferably less than about 100 microns; that the prior austenite grain size is preferably less than about 50 microns, more preferably less than about 35 microns, and even more preferably less than about 20 microns; and that the martensite/bainite packet size is preferably less than about 20 microns, more preferably less than about 15 microns, and even more preferably less than about 10 microns. As used herein, "grain size" means grain size as determined by the line intercept method, as is familiar to those skilled in the art.

The Effect of Low Inclusion Content

The low inclusion content tends to increase cleavage toughness by eliminating potential cleavage crack initiation sites and/or by reducing the number of micro-stress concentration sites. The low inclusion content tends to increase ductile fracture toughness by reducing the number of microvoid initiation sites.

Weldments made according to this invention preferably have a low inclusion content, but are not inclusion-free. Inclusions can contribute significantly to achieving optimum weld metal properties. First, they act as deoxidizers in the molten weld metal pool. Low oxygen content in the shielding gas is preferred for making weldments according to this invention, thus decreasing the need for deoxidation; however, some deoxidation potential in the molten weld metal pool is still preferred. Second, inclusions can be useful in controlling columnar and prior austenite grain growth through grain boundary pinning. Limiting grain growth at elevated temperatures promotes a small room temperature grain size. However, because the low heat input for making weldments according to this invention helps limit grain size, the inclusion content can be reduced to a level that enhances toughness, but still provides useful grain boundary pinning effects.

Weldments made according to this invention will achieve high strengths as previously noted. In the case of lower strength weld metals, it is often a designed feature to created a significant volume fraction of Ti-based inclusions for the purpose of nucleating acicular ferrite. For such lower strength weldments, acicular ferrite is the preferred microstructure due to its good strength and toughness properties. For the current invention, however, where higher strengths are of interest, it is an intentional feature to avoid a large volume fraction of inclusions that nucleate acicular ferrite. Rather it is preferred to create a microstructure dominated by lath martensite.

Achieving the Desired Inclusion Size/Content

The preferred low inclusion content in weldments according to the present invention is afforded by the selection and delivery of an appropriate shielding gas, by maintaining good weld cleanliness, and by utilizing a welding consumable wire with low amounts of sulfur, phosphorus, oxygen, and silicon. The specific chemistry of the welding consumable wire is designed to give the desired weld metal chemistry, which in turn is chosen based on the desired mechanical properties. The desired mechanical properties depend on the specific container design; and this invention covers a range of weld metal chemistries capable of accommodating a range of designs. Using the welding method of this invention the bulk weld metal will be minimally diluted by the base metal and, therefore, the chemistry of the welding consumable wire will be nearly the same as the chemistry of the weld metal as described herein. According to the welding technique of this invention, dilution is expected to be less than about 15%, but often less than about 10%. For areas close to the center of the weld metal, dilution is expected to be less than about 5%. Using any well known reverse dilution calculation method, one skilled in the art is capable of calculating the welding consumable wire chemistry for use in the method of the present invention to obtain the desired weld metal chemistry. The shielding gas is preferably low in $CO_2$ and/or $O_2$ content. Preferably the shielding gas comprises less than about 10 vol %, more preferably less than about 5 vol %, and even more preferably less than about 2 vol %, of $CO_2$ and/or $O_2$. The major component of the shielding gas is preferably argon; and the shielding gas preferably comprises about 80 vol % or more argon, and more preferably more than about 90 vol %. Helium can be added to the shielding gas in amounts up to about 12 vol % to improve arc operating characteristics or weld bead penetration and profile. If necessary, for a specific storage container design, impurities from the shielding gas that tend to lead to non-metallic inclusion formation in the weld metal, as are known to those skilled in the art, can be further reduced by delivering the gas though a nanochem filter, a device known to those skilled in the art of precision TIG welding. To aid the achievement of low weld metal inclusion content in the weld metal, the welding consumable wire and the base material are preferably themselves low in oxygen, sulfur, and phosphorus. The above features of the welding method of this invention produce a weld metal that contains preferably less than about 150 ppm of P, but more preferably less than about 50 ppm of P, less than about 150 ppm of sulfur, but more preferably less than about 30 ppm of sulfur, and less than about 300 ppm of oxygen, but more preferably less than about 250 ppm of oxygen. For certain cryogenic storage container designs, the oxygen content of the weld metal is preferably controlled to less than about 200 ppm.

With respect to inclusion size, the low welding heat input that is preferred for making weldments according to this invention, is selected to produce limited superheating and a fast cooling rate, thus limiting the growth time of the inclusions in the molten weld metal pool. Additionally, small amounts of Al, Ti, and Zr (less than about 0.015 wt. % of each) can be added individually or in combination to form small oxides. These elements are selected due to their known high affinity for oxygen. With respect to Ti, the amount of this element should be kept low, preferably less than about 0.010 wt %, to prevent too much acicular ferrite nucleation. The inclusions created by this invention are, on average, less than about 700 nm in diameter, but preferably in the range of about 200 nm to about 500 nm in diameter. The number of non-metallic inclusions per unit area, e.g., of the surface of a slice of the weld metal created by this invention, that are larger than about 1000 nm in diameter is preferably low, i.e., is preferably less than about 250 per $mm^2$.

The Balance Between Preheat and Heat Input

The PLNG application requires a high strength steel which may necessitate some level of preheat to prevent weld cracking. Preheat can alter the weld cooling rate (higher preheat promoting slower cooling) and it is an object of this invention to balance preheat and welding heat input so as to (1) preclude weld cracking, and (2) produce a fine-grained microstructure. Preheat is preferably between room temperature and about 200° C. (392° F.), but as will be familiar to those skilled in the art, the specific preheat temperature is preferably chosen in consideration of material weldability and welding heat input. Material weldability can be assessed using any one of several test methods that are known to those skilled in the art, such as the Controlled Thermal Severity Test, the Y-groove test, or the Welding Institute of Canada test. "Mock-ups" may also serve this purpose whereby weldments of the actual base and weld metals are joined using candidate fabrication procedures. The mock-ups are preferably of sufficient size to impose the level of restraint that will occur in the actual storage container.

Pulsing Power Supply

In general, a pulsing power supply can be used with any of the gas shielded processes that are preferred for use in the welding method of this invention. Losses in arc stability or penetration capability due to wire/gas chemistry selections can, to a significant degree, be regained using a pulsed power supply. For example, in the case that this invention is practiced using low heat input TIG welding and a low sulfur consumable wire, weld bead penetration can be enhanced using a pulsing power supply.

Fracture Control

As will be familiar to those skilled in the art, the operating conditions taken into consideration in the design of storage containers constructed from a welded steel for transporting pressurized, cryogenic fluids, include among other things, the operating pressure and temperature, as well as additional stresses that are likely to be imposed on the steel and the weldments. Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "PD 6493: 1991", may be used to determine the maximum allowable flaw sizes for the containers based on the fracture toughness of the steel and weldment (including HAZ) and the imposed stresses on the container. A person skilled in the art can develop a fracture control program to mitigate fracture initiation through (i) appropriate container design to minimize imposed stresses, (ii) appropriate manufacturing quality control to minimize defects, (iii) appropriate control of life cycle loads and pressures applied to the container, and (iv) an appropriate inspection program to reliably detect flaws and defects in the container. A preferred design philosophy for storage containers welded according to the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a pressure vessel or container.

Figure 1B:
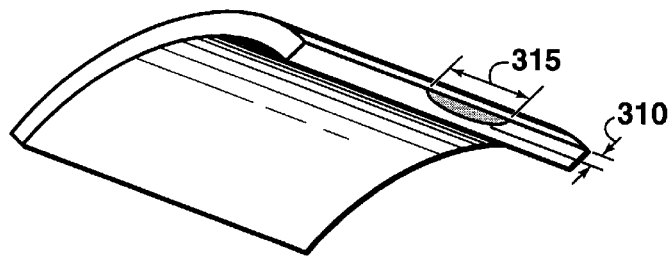
FIG. 1B illustrates the geometry (length and depth) of a flaw.

FIG. 1B illustrates a flaw of flaw length 315 and flaw depth 310. PD6493 is used to calculate values for the critical flaw size plot 300 shown in FIG. 1A based on the following design conditions:

| | |
|---|---|
| Vessel Diameter: | 4.57 m (15 ft) |
| Vessel Wall Thickness: | 25.4 mm (1.00 in.) |
| Design Pressure: | 3445 kPa (500 psi) |
| Allowable Hoop Stress: | 333 MPa (48.3 ksi). |

For the purpose of this example, a surface flaw length of 100 mm (4 inches), e.g., an axial flaw located in a seam weld, is assumed. Referring now to FIG. 1A, plot 300 shows the value for critical flaw depth as a function of CTOD fracture toughness and of residual stress, for residual stress levels of 15, 50 and 100 percent of yield stress. Residual stresses can be generated due to fabrication and welding; and PD6493 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the pressure vessel steel at the minimum service temperature, the vessel fabrication can be adjusted to reduce the residual stresses and an inspection program can be implemented (for both initial inspection and in-service inspection) to detect and measure flaws for comparison against critical flaw size. In this example, if the steel has a CTOD toughness of 0.025 mm at the minimum service temperature (as measured using laboratory specimens) and the residual stresses are reduced to 15 percent of the steel yield strength, then the value for critical flaw depth is approximately 4 mm (see point 320 on FIG. 1A). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.025 mm CTOD toughness generally correlates to a CVN value of about 37 J. This example is not intended to limit this invention in any way.

EXAMPLES

In the following Examples, a welding method according to the present invention is used for welding a base steel of the type described in a co-pending U.S. patent application entitled "ULTRA-HIGH STRENGTH, WELDABLE STEELS WITH EXCELLENT ULTRA-LOW TEMPERATURE TOUGHNESS" with a priority date of Dec. 19, 1997 and identified by the USPTO as application Ser. No. 09/099, 152 and has been published in WO 99/32671. For the purpose of these Examples, the base steel comprises: 0.05 wt % carbon, 1.70 wt % manganese, 0.075 wt % silicon, 0.40 wt % chromium, 0.2 wt % molybdenum, 2.0 wt % nickel, and 0.05 wt % Nb, and other alloying elements within the ranges described in application Ser. No. 09/099,152, and in WO 99/32671 including at a minimum, from about 0.008 wt % to about 0.03 wt % titanium, from about 0.001 wt % to about 0.05 wt % aluminum, and from about 0.002 wt % to about 0.005 wt % nitrogen. Additionally, residuals are preferably substantially minimized in the base steel, e.g., phosphorous (P) content is preferably less than about 0.01 wt %; sulfur (S) content is preferably less than about 0.004 wt %; and oxygen (O) content is preferably less than about 0.002 wt %. A steel slab having this chemistry is prepared to produce an ultra-high strength, dual phase steel plate having a microstructure comprising about 10 vol % to about 40 vol % of a first phase of substantially 100 vol % ("essentially") ferrite and about 60 vol % to about 90 vol % of a second phase of predominantly fine-grained lath martensite, fine-grained lower bainite, or mixtures thereof. In somewhat greater detail, the base steel for these Examples is prepared by forming a slab of the desired composition, as described above; heating the slab to a temperature of from about 955° C. to about 1065° C. (1750° F. –1950° F.); hot rolling the slab to form steel plate in one or more passes providing about 30 percent to about 70 percent reduction in a first temperature range in which austenite recrystallizes, i.e., above about the $T_{nr}$ temperature, further hot rolling the steel plate in one or more passes providing about 40 percent to about 80 percent reduction in a second temperature range below about the $T_{nr}$ temperature and above about the $Ar_3$ transformation temperature, and finish rolling the steel plate in one or more passes to provide about 15 percent to about 50 percent reduction in the intercritical temperature range below about the $Ar_3$ transformation temperature and above about the $Ar_1$ transformation temperature. The hot rolled steel plate is then quenched at a cooling rate of about 10° C. per second to about 40° C. per second (18° F./sec–72° F./sec) to a suitable Quench Stop Temperature (QST) preferably below about the $M_S$ transformation temperature plus 200° C. (360° F.), at which time the quenching is terminated. The steel plate is allowed to air cool to ambient temperature after quenching is terminated. (See Glossary for definitions of $T_{nr}$ temperature, and of $Ar_3$, $Ar_1$, and $M_S$ transformation temperatures.)

Example 1

In a first example of the method of the present invention, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as the above-described base steel, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Example 2

In another example of the method of the present invention, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as the above-described base steel, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Example 3

In another example of the method of the present invention, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % Zr, less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as the above-described base steel, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

While the present invention has been described in terms of one or more preferred embodiments, it should be understood that other modifications may be made without departing from the scope of the invention, which is set forth in the following claims. The welding method of this invention may be used with many steels other than the ultra-high strength, low alloy steels described herein, which are provided for the purpose of example only.

| | Glossary of terms |
|---|---|
| $Ar_1$ transformation temperature: | the temperature at which transformation of austenite to ferrite or to ferrite plus cementite is completed during cooling; |
| $Ar_3$ transformation temperature: | the temperature at which austenite begins to transform to ferrite during cooling; |
| BCC: | body-centered cubic; |
| Charpy (Charpy V-notch) toughness: | the energy, in ft-lbs. or Joules, measured upon breaking a Charpy V-notch specimen; |
| cleavage toughness: | the resistance of a steel to cleavage fracture, which property (for example, without limitation) can be measured using the CTOD test or can be established using the DBTT from a group of Charpy V-notch tests; |
| cooling rate: | cooling rate at the center, or substantially at the center, of the plate thickness; |
| cryogenic temperature: | any temperature lower than about −40° C. (−40° F.); |
| CTOD: | crack tip opening displacement; |
| CVN: | Charpy V-notch; |
| DBTT (Ductile-to-Brittle Transition Temperature): | delineates the two fracture regimes in structural steels; at temperatures below the DBTT, failure tends to occur by low energy cleavage (brittle) fracture, while at temperatures above the DBTT, failure tends to occur by high energy ductile fracture; |
| dislocation: | a linear imperfection in a crystalline array of atoms; |
| dislocation blockage: | a phenomena whereby an obstacle (such as a grain boundary or a precipitate) prevents or hinders the movement of dislocations in a metal; |
| dislocation pileup: | occurs when a plurality of dislocations that are moving on the same, or nearly the same, slip |

-continued

| Glossary of terms | |
|---|---|
| | plane, run into an obstacle and stack up next to each other; |
| essentially: | substantially 100 vol %; |
| fine-grained structure: | means that the columnar grain size (width) is preferably less than about 150 microns, and more preferably less than about 100 microns; that the prior austenite grain size is preferably less than about 50 microns, more preferably less than about 35 microns, and even more preferably less than about 20 microns; and that the martensite/bainite packet size is preferably less than about 20 microns, more preferably less than about 15 microns, and even more preferably less than about 10 microns; |
| GMAW: | gas metal arc welding; |
| grain size: | grain size as determined by the line intercept method; |
| HAZ: | heat-affected zone; |
| intercritical temperature range: | from about the $Ar_3$ transformation temperature to about the $Ar_1$ transformation temperature on cooling; |
| $K_{IC}$: | critical stress intensity factor; |
| kJ: | kilojoule; |
| kPa: | thousands of pascals; |
| ksi: | thousands of pounds per square inch; |
| low alloy steel: | a steel containing iron and less than about 10 wt % total alloy additives; |
| low heat input welding: | welding with arc energies of preferably within the range of about 0.3 kJ/mm to about 2.5 kJ/mm (7.6 kJ/inch to 63.5 kJ/inch), but more preferably within the range of about 0.5 kJ/mm to about 1.5 kJ/mm (12.7 kJ/inch to 38 kJ/inch); |
| low non-metallic inclusion content: | the number of non-metallic inclusions per unit area, e.g., of the surface of a slice of the weld metal created by this invention, that are larger than about 1000 nm in diameter is preferably less than about 250 per $mm^2$; |
| maximum allowable flaw size: | critical flaw length and depth; |
| microcrack: | the first instance of material separation at the outset of cleavage fracture initiation; |
| microstrains: | strains occurring on a sub-grain scale around a single (or group of) discontinuity (or discontinuities), which may include, for example, an inclusion, a precipitate, or a small area of a second phase; |
| microvoid: | a cavity occurring near a discontinuity in a steel matrix such as an inclusion, a precipitate, or a small area of a second phase; |
| MPa: | millions of pascals; |
| $M_S$ transformation temperature: | the temperature at which transformation of austenite to martensite starts during cooling; |
| ppm: | parts per million; |
| quenching: | as used in describing the present invention, accelerated cooling by any means whereby a fluid selected for its tendency to increase the cooling rate of the steel is utilized, as opposed to air cooling; |
| Quench Stop Temperature (QST): | the highest, or substantially the highest, temperature reached at the surface of the plate, after quenching is stopped, because of heat transmitted from the mid-thickness of the plate; |
| slab: | a piece of steel having any dimensions; |
| tensile strength: | in tensile testing, the ratio of maximum load to original cross-sectional area; |
| TIG welding: | tungsten inert gas welding; |
| $T_{nr}$ temperature: | the temperature below which austenite does not recrystallize; |
| USPTO: | United States Patent and Trademark Office; and |
| weldment: | a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that |

-continued

| Glossary of terms |
| --- |
| was welded, the number of weldments required to fabricate the item, and the distance between weldments. |

I claim:

1. A method of welding a base metal to produce a weldment having a tensile strength greater than about 900 MPa (130 ksi), said method comprising the step of:
   (i) welding using a gas shielded welding process, an argon-based shielding gas, and a welding consumable wire that produces a weld metal that comprises iron and the following alloying elements:
      about 0.06 wt % to about 0.10 wt % carbon;
      about 1.60 wt % to about 2.05 wt % manganese;
      about 0.20 wt % to about 0.32 wt % silicon;
      about 1.87 wt % to about 6.00 wt % nickel;
      about 0.30 wt % to about 0.87 wt % chromium; and
      about 0.40 wt % to about 0.56 wt % molybdenum.

2. The method of claim 1 wherein said weld metal further comprises at least one additive selected from the group consisting of 0 wt % to about 0.30 wt % copper, 0 wt % to about 0.020 wt % aluminum; 0 wt % to about 0.015 wt % zirconium, and 0 wt % to about 0.010 wt % titanium.

3. The method of claim 1, wherein low heat input welding is used in said gas shielded welding process.

4. The method of claim 3, wherein said low heat input welding is done at an arc energy within the range of 0.5 kJ/mm to about 1.5 kJ/mm (12.7 kJ/inch to 38 kJ/inch).

5. The method of claim 1, wherein said gas shielded welding process is GMAW, and said weld metal comprises iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur.

6. The method of claim 5, wherein said gas shielded welding process is done at an arc energy within the range of about 0.3 kJ/mm to about 1.5 kJ/mm (7.6 kJ/inch to 38 kJ/inch).

7. The method of claim 5, wherein said weld metal has a DBTT below about −73° C. (−100° F.).

8. The method of claim 1, wherein said gas shielded welding process is GMAW, and said weld metal comprises iron and about 1.60 wt % manganese, about 0.25 wt % silicon, about 1.87 wt % nickel, about 0.87 wt % chromium, about 0.51 wt % molybdenum, less than about 75 ppm phosphorous, less than about 100 ppm sulfur, and less than about 0.10 carbon.

9. The method of claim 8, wherein said gas shielded welding process is done with an argon-based shielding gas with less than about 1 wt % oxygen.

10. The method of claim 8, wherein said gas shielded welding process is done at an arc energy within the range of about 0.3 kJ/mm to about 1.5 kJ/mm (7.6 kJ/inch to 38 kJ/inch).

11. The method of claim 8, wherein said weld metal has a DBTT below about −73° C. (−100° F.).

12. The method of claim 1, wherein said gas shielded welding process is TIG, and said weld metal comprises iron and about 1.80 wt % manganese, about 0.20 wt % silicon, about 4.00 wt % nickel, about 0.5 wt % chromium, about 0.40 wt % molybdenum, about 0.30 wt % copper, about 0.02 wt % aluminum, about 0.010 wt % titanium, about 0.015 wt % zirconium, less than about 50 ppm phosphorous, less than about 30 ppm sulfur, and less than about 0.07 wt % carbon.

13. The method of claim 12, wherein said gas shielded welding process is done with a heat input in the range of about 0.3 kJ/mm to about 1.5 kJ/mm (7.6 kJ/inch to 38 kJ/inch) and a preheat of about 100° C. (212° F.).

14. The method of claim 12, wherein said weld metal has a DBTT below about −73° C. (−100° F.).

15. The method of claim 1, wherein said weld metal has a microstructure comprising a fine-grained BCC crystal structure dominated by auto-tempered lath martensite and a low non-metallic inclusion content.

16. A weldment having a tensile strength of at least about 900 MPa (130 ksi) produced by welding at least 2 edges of a base metal using a gas shielded welding process, an argon-based shielding gas, and a welding consumable wire, wherein said weldment comprises:
   (i) a weld metal that comprises iron and the following alloying elements:
      about 0.06 wt % to about 0.10 wt % carbon;
      about 1.60 wt % to about 2.05 wt % manganese;
      about 0.20 wt % to about 0.32 wt % silicon;
      about 1.87 wt % to about 4.00 wt % nickel;
      about 0.30 wt % to about 0.87 wt % chromium; and
      about 0.40 wt % to about 0.56 wt % molybdenum;
   (ii) a heat affected zone; and
   (iii) portions of said base metal in the near vicinity of the HAZ.

17. The weldment of claim 16 wherein said weld metal further comprises at least one additive selected from the group consisting of 0 wt % to about 0.30 wt % copper, 0 wt % to about 0.020 wt % aluminum; 0 wt % to about 0.015 wt % zirconium, and 0 wt % to about 0.010 wt % titanium.

* * * * *